US010232578B2

(12) United States Patent
Jussel et al.

(10) Patent No.: US 10,232,578 B2
(45) Date of Patent: Mar. 19, 2019

(54) BLOW COUNT OPTIMIZATION

(71) Applicant: Liebherr-Werk Nenzing GmbH, Nenzing (AT)

(72) Inventors: Patrick Jussel, Blundenz (AT); Lukas Fink, Nueziders (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 0 days.

(21) Appl. No.: 15/653,405

(22) Filed: Jul. 18, 2017

(65) Prior Publication Data

US 2018/0022051 A1    Jan. 25, 2018

(30) Foreign Application Priority Data

Jul. 19, 2016 (DE) .......................... 10 2016 008 819

(51) Int. Cl.
*B30B 15/14* (2006.01)
*B30B 15/06* (2006.01)
*E02D 3/046* (2006.01)
*E02D 7/08* (2006.01)
*G01L 1/02* (2006.01)

(52) U.S. Cl.
CPC .......... *B30B 15/148* (2013.01); *B30B 15/065* (2013.01); *E02D 3/046* (2013.01); *E02D 7/08* (2013.01); *G01L 1/02* (2013.01)

(58) Field of Classification Search
CPC ......... E02D 3/046; E02D 7/08; B30B 15/065; B30B 15/148; G01L 1/02
See application file for complete search history.

(56) References Cited

U.S. PATENT DOCUMENTS

| 3,938,595 A | * | 2/1976 | Swenson | ................ E02D 7/08 173/1 |
| 4,580,765 A | * | 4/1986 | Nicholson | .............. E02D 3/046 173/87 |
| 4,660,655 A | * | 4/1987 | Wilner | ..................... E02D 7/08 173/82 |

(Continued)

FOREIGN PATENT DOCUMENTS

| DE | 102007062301 | * | 6/2009 | .............. E02D 7/08 |
| DE | 102007062301 B4 | | 9/2011 | |

(Continued)

*Primary Examiner* — Carib A Oquendo
(74) *Attorney, Agent, or Firm* — McCoy Russell LLP

(57) ABSTRACT

A method of compacting soil via a base machine, the base machine having ram material provided at at least one cable and having a regulation/control apparatus, includes raising the ram material from the land area to be compacted, with a zero point being stored at which no slackline is present. The method further includes raising the ram material to a lift height, carrying out a compaction procedure by dropping the ram material from a drop height onto the land area to be compacted, again raising the ram material from the land area to be compacted, with a further zero point being stored at which no slackline is present, determining and storing a compaction progress, and repeating the previous steps until the compaction progresses of each of a predefined number of consecutive compaction procedures are smaller than or equal to a predefined minimum progress.

11 Claims, 3 Drawing Sheets

(56) References Cited

U.S. PATENT DOCUMENTS

| | | | | |
|---|---|---|---|---|
| 4,977,965 A | * | 12/1990 | Rupe | E02D 1/04 |
| | | | | 173/81 |
| 2005/0072965 A1 | * | 4/2005 | Sanders | B66D 1/485 |
| | | | | 254/361 |
| 2017/0241097 A1 | * | 8/2017 | Sharp | E01C 19/34 |
| 2018/0057319 A1 | * | 3/2018 | Hirate | B66C 13/16 |

FOREIGN PATENT DOCUMENTS

| | | | |
|---|---|---|---|
| EP | 0413189 | * | 2/1991 |
| JP | 60195218 | * | 10/1985 |
| JP | 07179291 | * | 7/1995 |
| WO | WO2010089096 | * | 8/2010 |

* cited by examiner

BLOW COUNT OPTIMIZATION

CROSS REFERENCE TO RELATED APPLICATIONS

This application claims priority to German Patent Application No. 10 2016 008 819.2, entitled "Blow Count Optimization," filed Jul. 19, 2016, the entire contents of which are hereby incorporated by reference for all purposes.

TECHNICAL FIELD

The present disclosure relates to a method of soil compaction by means of a base machine having ram material provided at at least one cable and having a regulation/control apparatus, wherein the method comprises the raising of the ram material from the land area to be compacted as a first step, with a zero point at which no slackline is present being stored. Next, the ram material is raised to a lift height and then the compaction procedure is effected by the dropping of the ram material from a corresponding drop height onto the land area to be compacted.

BACKGROUND AND SUMMARY

The ram material is then again raised and a further corresponding zero point is stored beforehand. In accordance with the method, a compaction progress that takes place is then determined and stored and the previous steps are repeated until the compaction progresses of a specific number of consecutive compaction procedures are smaller than or equal to a predefined minimum progress.

It is known to provide the operator of a soil compaction machine or of a base machine for soil compaction with a specification of how many defined blows are required for a corresponding soil compaction has to be carried out. Preparatory calculations are required for this purpose with reference to which a number of blows required for soil compaction is determined in dependence on the soil properties of the soil to be compacted.

It is alternatively or additionally also possible to dynamically determine whether an achieved degree of compaction is sufficient by means of a measurement. It can accordingly be determined whether further blows or compaction work are required. However, disadvantageously, additional equipment is required to carry out the measurements. This represents an increased effort both in procurement of the corresponding equipment and in its use.

It is therefore the object of the present disclosure to provide a method of soil compaction, wherein in particular no additional measurement systems are required to determine the compaction progress and wherein a simplified apparatus can be used.

This object is achieved in accordance with the present disclosure by a method of soil compaction by means of a base machine, wherein the base machine comprises ram material provided at at least one cable and a control/regulation apparatus and wherein the method comprises the following steps:
  raising the ram material from the land area to be compacted, with a zero point being stored at which no slackline is present;
  raising the ram material to a lift height;
  carrying out a compaction procedure by dropping the ram material from a drop height onto the land area to be compacted;
  a repeat raising of the ram material from the land area to be compacted, with a further zero point being stored at which no slackline is present;
  determining and storing a compaction progress; and
  repeating the previous steps until the compaction progresses of a predefined number of consecutive compaction procedures are smaller than or equal to a predefined minimum progress.

The term slackline here means that the cable carrying the ram material is not completely unloaded, but that rather at least some of the weight force of the ram material is carried by the cable. The cable is thus at least partially tensioned by the weight force of the ram material and thereby sags as a slackline or as an unloaded cable. It is decisive for the determination of the zero points that no slackline is present at the time of the measurement or of the saving of the zero point since otherwise it would not be possible to determine the correct zero point and thus not the correct distance between, for example, the zero point and the lift height. The zero point can in this respect, for example, be determined or saved as a function of the length of the unreeled or reeled up cable.

The terms of the zero point and of the compaction progress will be defined in more detail in the embodiment described further below. The predefined number of consecutive compaction procedures can be input at the regulation/control apparatus (e.g., at a user interface of the regulation/control apparatus) by an operator. It is also conceivable that this number is stored in the regulation/control apparatus and/or is polled from it and has to be input accordingly by an operator. The same applies to the predefined minimum progress that can be indicated by the operator or that can alternatively or additionally be stored in the regulation/control apparatus (e.g., stored in non-transitory memory of the regulation/control apparatus).

It is conceivable in one embodiment that the process displays and/or is ended when the compaction progresses of a predefined number of consecutive compaction procedures are smaller than or equal to a predefined minimum progress. The compaction can thus be automatically ended in accordance with the process when a desired degree of compaction of the soil has been reached. The reaching of a desired degree of compaction is in this respect a function of the input or stored minimum progress and of the predefined number of compaction procedures required for this purpose. Provision can also be made in accordance with the process that only the reaching of the corresponding degree of compaction is displayed to the operator, for example via a display of the regulation/control apparatus.

It is conceivable in a further embodiment that the zero point is determined by a zero calibration and/or is detected by a sensor system. The zero point can thus, for example, be set manually by an operator in that the ram material is placed onto the ground and the cable that bears the ram material is tautened without raising the ram material from the ground. This position of the ram material corresponds to the zero point and can be associated with the cable length that is unreeled or reeled up in this process. The zero point can also be detected automatically via a corresponding sensor system, with the ram material likewise being able to be placed on the subsurface and with it being able to be determined by means of the sensor system whether the cable that bears the ram material is loaded or tautened and thus no slackline is present. A zero point and its corresponding cable length can thus also be detected automatically.

It is conceivable in a further embodiment that the sensor system for detecting the zero point measures the power of a winch motor of the base machine and/or load measurement signals of the load at the cable, in particular by means of load measuring pins in cable pulleys and/or strain measuring cells in or at the cable or in cable struts. Devices or sensors typically present at the base machine can thus be used for determining the zero point and an additional and disadvantageously expensive and complex provision of corresponding devices is advantageously not necessary.

It is conceivable in a further embodiment that the lift height of the ram material is determined automatically or is set manually via a cable length measurement, in particular via the number of revolutions of the hoisting winch. It is furthermore conceivable that the lift height is constant for all compaction procedures. It can thus be ensured that the same energy is introduced into the land area on every compaction procedure and that a uniform compaction can thereby take place.

It is conceivable in a further embodiment that the cable is braked during, before and/or after the landing of the ram material on the land area to be compacted. A slacking line can thereby be effectively prevented or reduced and the compaction can thus be carried out in an accelerated manner.

It is also conceivable in an embodiment to also repeat the method described above when a permitted tolerance is fallen below or exceeded on wall collapses ($Y_{tol}$). It is accordingly possible in accordance with the method to automatically take any wall collapses into consideration so that an intervention on the part of the operator of the base machine is not necessary here.

The present disclosure is also directed to an apparatus, in particular to a cable-operated excavator or a rammer that is configured to carry out the methods of soil compaction described herein. The apparatus can in particular comprise devices for determining the zero points, devices for measuring the power of the winch motor, devices for the load measurement of the load at the cable, in particular load measuring pins and/or strain measuring cells, and/or devices for measuring the cable length.

Further details and advantages of the present disclosure will be shown with reference to the Figures.

DETAILED DESCRIPTION

During dynamic soil compaction, a striking weight or a ram material or a ram weight is raised, starting from the ground, to a desired drop height, for example by means of the winch of a cable-operated excavator. The winch or the winch brake can be released at the highest point of the striking weight and the striking weight can thus be dropped onto a land area to be compacted.

Shortly before, during and/or shortly after the landing of the ram weight on the soil, it or the cable holding the ram weight can be braked. The method in accordance with the present disclosure is in this respect independent of how the braking process is carried out or of which kind of braking apparatus is used for this purpose.

The slackline can be kept very short by this braking or the occurrence of a slackline can be completely prevented. On the repeat raising of the ram weight, the then current zero position of the ram weight can be determined and can be saved on the machine or by the regulation/control apparatus of the machine.

This method as well as similar alternatives thereto are known per se. The requirements of the method underlying the present disclosure are as follows:
  on the raising of the load it is determined where the current zero point is at which a slackline is no longer present. This can be done by a repeat, automatic zero calibration or with a corresponding sensor system (power of winch motor or load measuring signals that measure the load at the cable in any manner, for example load measuring pins in cable pulleys, strain measuring cells in the cable or in cable struts) by a measurement of the cable length at which this zero point is reached;
  the lift height of the ram weight is automatically determined by a cable length measurement (e.g. via the number of revolutions of the cable winch) and can also be set. This lift height can be constant for all blows or compaction processes;
  with a dropping ram weight, the ram weight is now braked by a corresponding regulation/control procedure before, during and/or after the landing on the ground to prevent slackline formation; and
  the new zero point position is determined on a repeat raising of the load. This point should be further down than the zero point position of the preceding compacting procedure due to the compaction. There can, however, also be exceptions to this when, for example, collapses of the side wall or of the surroundings of the compacted area occur or when the compacted area is filled with filling material. Reference will be made to this further below.

As used herein, processes performed automatically may be initiated and/or performed by the regulation/control apparatus independent of input from an operator of the machine, whereas processes performed manually may be initiated and/or performed by an operator of the machine, either alone or in conjunction with the regulation/control apparatus.

Figure 1A:
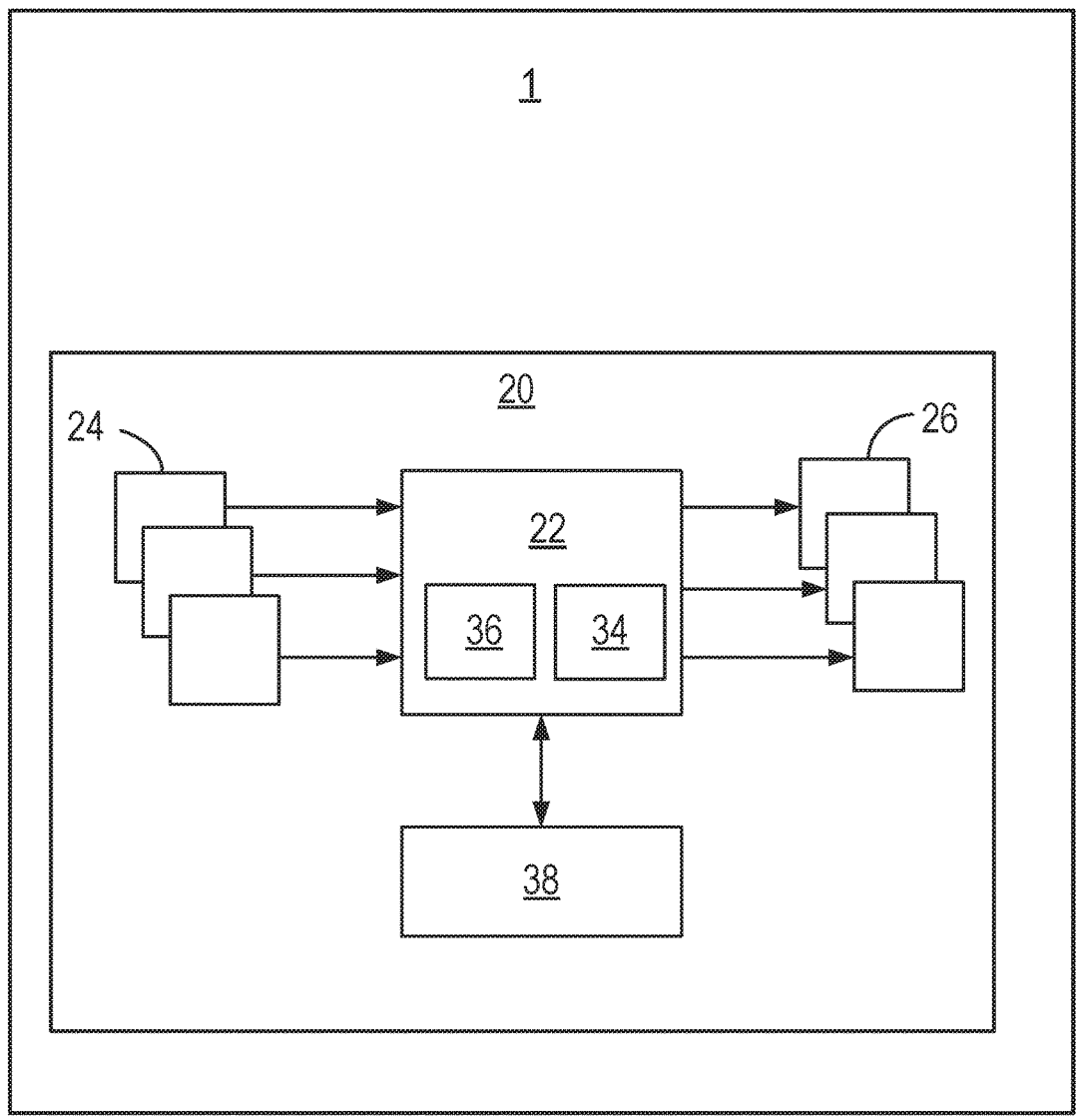
FIG. 1A schematically depicts an exemplary machine and control system thereof in accordance with the present disclosure.

FIG. 1A schematically shows a machine 1 (e.g., a soil compaction machine or a base machine configured to perform soil compaction) in accordance with the present disclosure. Machine 1 includes a control system 20, which alternatively referred to herein as a regulation/control apparatus. Control system 20 includes a control unit 22 communicating with sensors 24 and actuators 26. Control unit 22 includes a processor 34 and non-transitory memory 36, the non-transitory memory having instructions stored therein for carrying out the various control actions described herein, including control actions associated with the determination of parameters shown in FIG. 1B and the process procedure shown in FIG. 2. Control unit 22 receives signals from sensors 24 and sends signals to actuators 26 to adjust operation of the various components of the machine, based on the received signals and the instructions and other data stored in the non-transitory memory 36.

Sensors 24 (alternatively referred to herein as a sensor system) may include, for example, sensors detecting process data reflecting the condition of machine 1 or the condition of components of machine 1. For example, sensors 24 may include sensors detecting the zero point, the cable length corresponding to the zero point (e.g., the cable length at which the zero point is reached), the power (e.g., power output) of the winch motor, the load at the cable (the sensors for detecting the load at the cable including load measuring pins in the cable pulleys and/or strain measuring cells, for example). In some examples, existing sensors of the base machine may be used to detect the zero point, such that it is not necessary to equip the machine (or retrofit the machine) with additional devices or sensors for detecting the zero point relative to the standard sensors included as part of the machine.

Actuators 26 may include mechanical actuators, pneumatic actuators, thermal actuators, and the like which are associated with the components of the machine (e.g., actuators which effect movement/lifting of the ram weight, braking of the ram weight, adjustment of power/revolution speed/number of revolutions of the winch motor, etc.).

As shown, control system 20 further includes a user interface 38 which has a display and is in communication with control unit 22, and via which a machine operator may enter information into the processor and view displayed information. The input entered into the user interface by the operator may include position of the machine and/or the components thereof (e.g., via GPS), compaction per blow, speed of the ram material on impact, weight of the ram material, time per blow, number of blows, summed compaction, desired degree of compaction, etc. The information viewed by the operator via the user interface may include the current compaction point or progress, e.g., whether the progress per blow has fallen below a defined minimum progress after a definable number of blows, and/or whether the desired degree of compaction has been reached.

While user interface 38 is depicted as being part of machine 1, in other examples, the user interface may be remote from machine 1 and in communication with the control system via wired or wireless transmission channels.

Figure 1B:
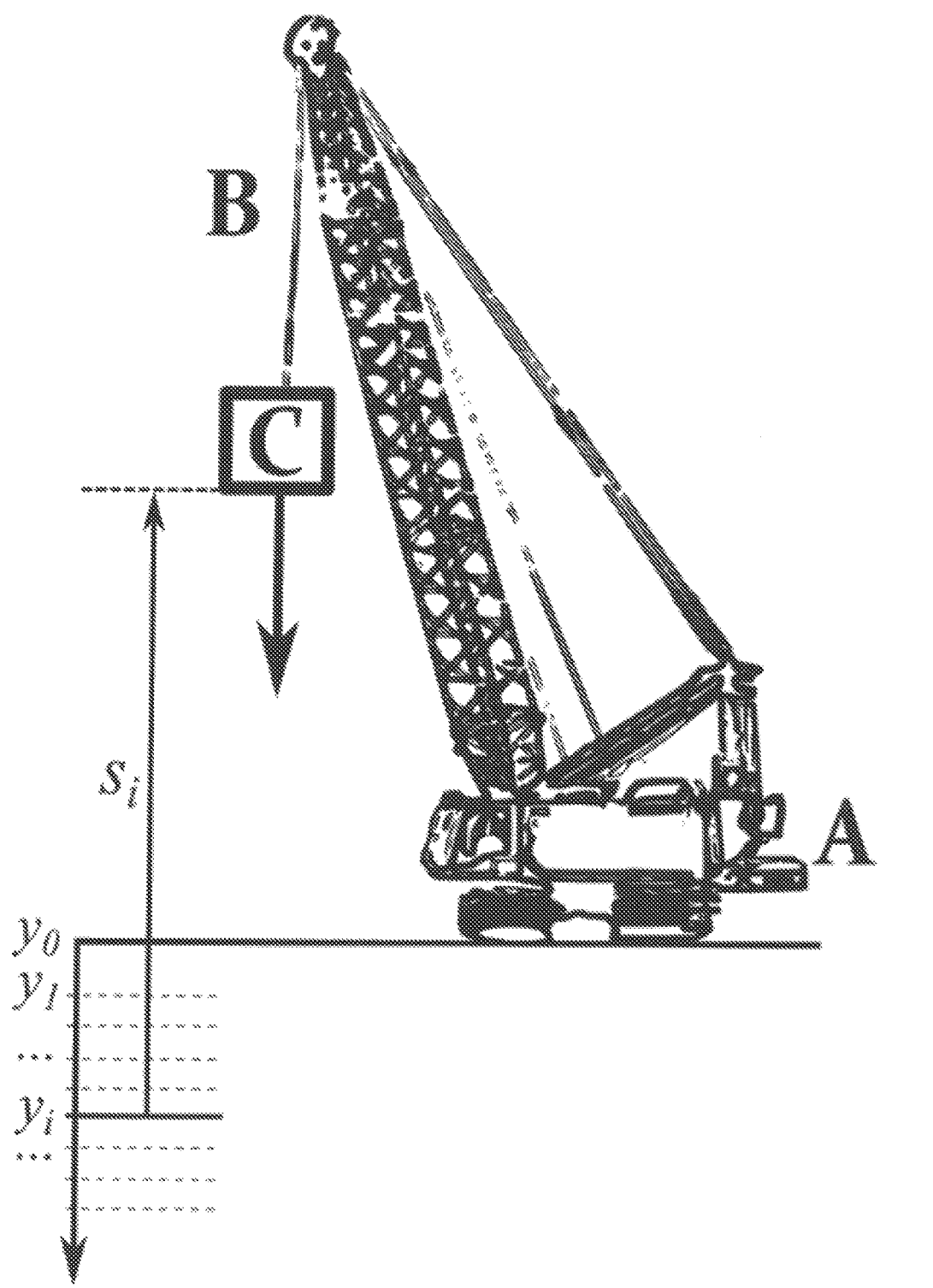
FIG. 1B shows a side view of a base machine with ram material and cable.

The method in accordance with the present disclosure is shown schematically in FIG. 1B. The base machine A is connected to the ram weight C via one or more cables B. The ram weight C is accelerated by dropping the ram weight C from a presettable, drop height $K=s_i-y_i$, that is optionally kept constant, and impacts the ground and compacts the soil below it with a brake activated shortly beforehand, at the same time and/or shortly thereafter. The parameter $s_i$ represents lift height, whereas the parameter $y_i$ represents a zero point. The distances or the drop height K shown in FIG. 1B can in this respect depend on the contact plane of the base machine A (e.g., the plane defined by the location at which the base machine contacts the ground therebelow).

The next zero point $y_{i+1}$ should now be further below (e.g., vertically below the contact plane of the base machine A). Exceptions can occur if, for example, a ram hole edge collapses or if filling material is filled into the ram hole. All further zero positions are successively determined and stored via a measurement of the cable length in the further blows. The difference between two zero positions $\Delta y_i = y_i - y_{i+1}$ is subsequently called a compaction progress (per blow).

A series of compaction progresses results from this with reference to which the extent of the compaction process can be read. The ram weight will first penetrate deeply into the soil and achieve a greater progress (e.g., a greater difference between the zero position prior to the blow, and the zero position after the blow); the progress achieved by each subsequent blow decreases continuously. A negative progress (e.g., in which the zero position after the blow is vertically above the zero position before the blow) can result due to collapses of the material into the ram hole or due to introduction of compaction material.

FIG. 1B shows a workflow diagram of the method in accordance with the disclosure. Instructions for carrying out the method shown in FIG. 1B may be executed by a processor (e.g., processor 34 of control system 20) based on instructions stored in non-transitory memory (e.g., non-transitory memory 36) and in conjunction with signals received from sensors (e.g., sensors 24). The control system may employ actuators (e.g., actuators 26) to perform actions associated with the method.

Figure 2:
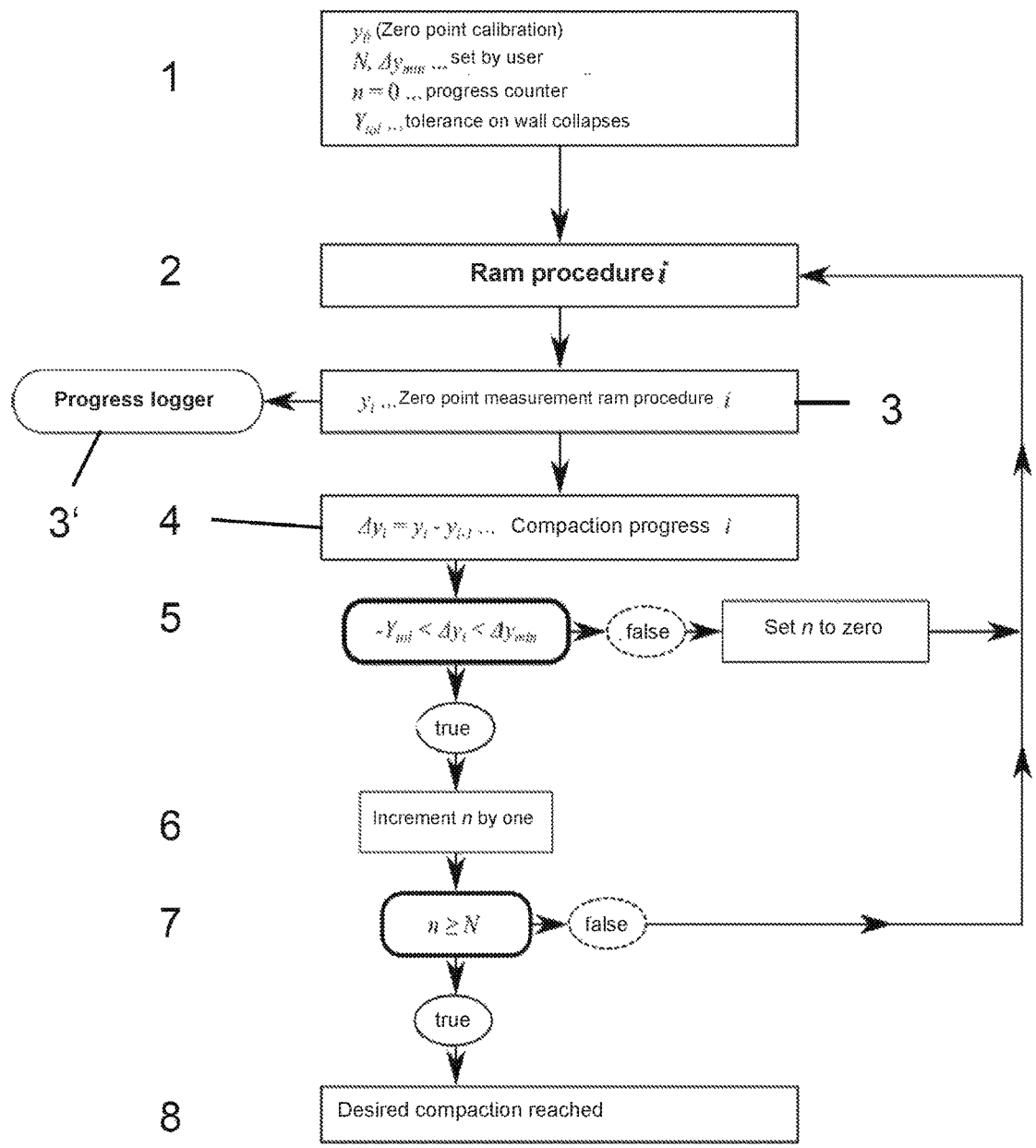
FIG. 2 shows a schematic representation of the process procedure described herein.

FIG. 2 shows a schematic representation of a process procedure in accordance with the disclosure. Instructions for carrying out the process procedure may be executed by a processor (e.g., processor 34 of control system 20) based on instructions stored in non-transitory memory (e.g., non-transitory memory 36) and in conjunction with signals received from sensors (e.g., sensors 24). The control system may employ actuators (e.g., actuators 26) to perform actions associated with the method.

In accordance with FIG. 2, different parameters for the compaction procedure can be set in a step 1, with an automatic or manual zero point calibration for setting a first zero point $y_0$, the number of compaction procedures N to be carried out at a maximum on a falling below of a minimum progress $\Delta y_{min}$, the minimum progress $\Delta y_{min}$ itself, and, optionally, permitted tolerance on wall collapses $Y_{tol}$ or their values multiplied by −1 being able to be set. A progress counter (e.g., a parameter stored in non-transitory memory) can also be set to n=0 automatically (e.g., initiated and performed by the control system without input from the operator) or manually (e.g., via operator input at the user interface) at the start of the compaction procedure.

In a second step 2, a compaction or ram procedure i is carried out, with the progress counter being incremented by one in each case at step 6 in the further course of the process.

Step 3 comprises the zero point determination for determining the new zero point present after the compaction, with the new zero point being able to be stored or logged using a progress logger 3'.

Step 4 comprises the determination of the compaction progress and optionally the saving of the compaction progress (e.g., in non-transitory memory 36 of control unit 22).

It is determined in step 5 whether the compaction progress $\Delta y_i$ is greater than the tolerance value on wall collapses $-Y_{tol}$ and is smaller than the minimum progress $\Delta y_{min}$.

If this does not apply (the determination is false), the progress counter is set to zero and steps 2, 3, 4 and 5 are repeated. If, in contrast, it does apply (the determination is true), the progress counter is incremented by one in step 6, as already mentioned, and a determination is made in step 7 whether the number of compaction procedures n determined using the progress counter is greater than or equal to the maximum number of compaction procedures N to be carried out on a falling below of the minimum progress $\Delta y_{min}$.

As shown in FIG. 2, the driver or the operator of the base machine has a corresponding feedback displayed on the display or on another indicator device if the progress per blow has fallen below a defined minimum progress $\Delta y_{min}$ after a definable number N of blows. N=2 can be assumed as an example, while $\Delta y_{min}$=10 cm can be determined. If a respective compaction progress of less than 5 cm is determined in two consecutive blows, these two values are below the predefined minimum progress $\Delta y_{min}$=10 cm so that the driver receives the indication 8 that a desired degree of compaction has been reached.

Provision can be made in a further sequence that all the information (e.g., position (e.g. via GPS), compaction per blow, speed of the ram material on impact, weight of the ram material, time per blow, number of blows, summed compaction, and inter alia further parameters derived therefrom) on the then current compaction point or progress are saved locally on the machine in a progress logger and can be viewed in a compressed manner by the machine operator via local or remote output mechanisms (e.g., the user interface, a printer, and/or via wireless or wired transmission channels) connected to the base machine.

In accordance with the present disclosure, it can advantageously be made easier for the operator to monitor the correct performance of the compaction procedure. This is done in that, in accordance with the method, the compaction progress is monitored using devices typically present on the base machine. It is thus advantageously avoided that compaction procedures are carried out beyond the actual compaction requirement or are stopped too soon, that is with too low a compaction. No additional measuring apparatus have to be provided for this purpose, but the devices present at the base machine can rather be correspondingly used or reprogrammed. This makes it possible to retrofit the method to already existing base hardware. The specific routines described herein may represent one or machines simply and also to implement it favorably with base machines to be manufactured as new.

Note that the example control methods included herein can be used with various machine configurations. The control methods disclosed herein (e.g., the process procedure shown in FIG. 2) may be stored as executable instructions in non-transitory memory and may be carried out by the control system of the machine, including the control unit in combination with the various sensors, actuators, and other more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various components in combination with the control system.

The invention claimed is:

1. A method of compacting soil via a base machine having a ram material provided, at least one cable and having a regulation/control apparatus, the method comprising:
   raising the ram material from a land area to be compacted, with a zero point being stored at which no slackline is present;
   raising the ram material to a lift height;
   carrying out a compaction procedure by dropping the ram material from a drop height onto the land area to be compacted;
   again raising the ram material from the land area to be compacted, with a further zero point being stored at which no slackline is present;
   determining and storing a compaction progress; and
   repeating the previous steps until the compaction progresses of a predefined number of consecutive compaction procedures are each smaller than or equal to a predefined minimum progress.

2. The method in accordance with claim 1, further comprising alerting an operator of the base machine, via a display, when the compaction progresses of the predefined number of consecutive compaction procedures is smaller than or equal to the predefined minimum progress.

3. The method in accordance with claim 1, wherein the zero point is determined by a zero calibration.

4. The method in accordance with claim 1, wherein the zero point is detected by a sensor system.

5. The method in accordance with claim 4, further comprising, with the sensor system, measuring a power of a winch motor of the base machine and/or load measurement signals of a load at the cable.

6. The method in accordance with claim 5, wherein the sensor system comprises load measuring pins in cable pulleys and/or strain measuring cells in or at the cable or in cable struts which perform the measurement(s).

7. The method in accordance with claim 1, wherein the lift height of the ram material is automatically determined or is manually set via a cable length measurement input to a user interface by an operator of the base machine.

8. The method in accordance with claim 7, wherein the cable length measurement comprises a number of revolutions of a cable winch.

9. The method in accordance with claim 1, wherein the lift height is constant for all compaction procedures.

10. The method in accordance with claim 1, wherein the cable is braked during, before, and/or after the landing of the ram material on the land area to be compacted.

11. An apparatus, in particular a cable-operated excavator or a rammer, that is configured for carrying out the method of compacting soil in accordance with claim 1.

* * * * *